United States Patent
Taniguchi et al.

[11] Patent Number: 5,969,459
[45] Date of Patent: Oct. 19, 1999

[54] ROTARY ELECTRIC MACHINE HAVING LUNDELL TYPE CORE

[75] Inventors: Makoto Taniguchi, Kariya; Takayasu Nimura, Nagoya, both of Japan

[73] Assignee: Denso Corporation, Kariya, Japan

[21] Appl. No.: 09/002,682

[22] Filed: Jan. 5, 1998

[30] Foreign Application Priority Data

Jan. 14, 1997 [JP] Japan ..................................... 9-004361

[51] Int. Cl.⁶ ........................... H02K 1/22; H02K 21/04; H02K 19/22
[52] U.S. Cl. .......................... 310/263; 310/60 R; 310/91; 310/181
[58] Field of Search ..................................... 310/263, 211, 310/212, 156, 58, 60 R, 258, 91, 67 R, 192, 181; 322/28, 46, 47, 49

[56] References Cited

U.S. PATENT DOCUMENTS

| | | | |
|---|---|---|---|
| 4,959,577 | 9/1990 | Radomski | 310/263 |
| 5,132,581 | 7/1992 | Kusase | 310/263 |
| 5,306,977 | 4/1994 | Hayashi | 310/263 |
| 5,483,116 | 1/1996 | Kusase et al. | 310/263 |
| 5,578,885 | 11/1996 | Alford et al. | 310/263 |

FOREIGN PATENT DOCUMENTS

| | | |
|---|---|---|
| 61-85045 | 4/1986 | Japan . |
| 3-265450 | 11/1991 | Japan . |
| 7-312854 | 11/1995 | Japan . |

*Primary Examiner*—Thomas M. Dougherty
*Assistant Examiner*—Tran N Nguyen
*Attorney, Agent, or Firm*—Pillsbury Madison & Sutro LLP

[57] ABSTRACT

A rotor of a rotary electric machine has a pair of pole core members each of which has a core portion and a plurality of claw poles extending axially from outer periphery of the core portion. A plurality of magnet holders with permanent magnets are held therein and a connection member axially fixes the magnet holders to the pole core members. The connection member has a pair of end plates disposed at opposite ends of the rotor and a plurality of connecting rods extending axially to mechanically connect the magnet holders from opposite ends.

10 Claims, 8 Drawing Sheets

ROTARY ELECTRIC MACHINE HAVING LUNDELL TYPE CORE

CROSS REFERENCE TO RELATED APPLICATION

The present application is based on and claims priority from Japanese Patent Application No. Hei 9-4361, filed on Jan. 14, 1997, the contents of which are incorporated herein by reference.

BACKGROUND OF THE INVENTION

1. Field of the Invention

The present invention relates to a rotary electric machine having a Lundell type pole core in the rotor thereof.

2. Description of the Related Art

An alternator for a vehicle includes a rotor having a Lundell type pole core which is composed of a pair of core members having a plurality of claw poles which extend axially. As the electric loads of a vehicle has increased, the amount of necessary output power from the alternator has increased. This has necessitated a reduction in the leakage flux between the pole cores.

U.S. Pat. No. 5,483,116 (or JP-A-7-123664) proposes a rotor in which a zigzag-ring-shaped magnet holder is disposed between a pair of pole members. The rotor holds a plurality of permanent magnets each of which is disposed between two adjacent claw poles. Therefore, the spaces between the pole members must have precise sizes to secure the holder. This necessitates precise machining.

JP-A-7-312854 proposes a rotor of an alternator which has covered permanent magnets. The covered permanent magnets are welded to the claw poles. In order to secure the permanent magnets, it is also necessary to have claw poles with a precise size. This necessitates additional machining.

U.S. Pat. No. 5,306,977 (or JP-A-207716) proposes a rotor in which permanent magnets are held by two non-magnetic rings. The rings are retained inside the claw poles. This structure also requires precise machining to reliably secure the permanent magnets.

SUMMARY OF THE INVENTION

A main object of the present invention is to provide an improved rotor having a Lundell-type pole core with an electric rotary machine in which permanent magnets can be installed through simple manufacturing steps.

Another object of the present invention is to provide a rotor having a plurality of claw poles and permanent magnets disposed therebetween in which the permanent magnets can be fixed in the axial direction.

According to a main feature of the present invention, a rotor of a rotary electric machine has a pair of pole core members each of which has a core portion and a plurality of claw poles extending axially from an outer periphery of the core portion. A plurality of magnet holders and permanent magnets are held in the magnet holders and disposed in spaces between two of the claw poles. A connection member axially fixes the magnet holders to the pole core members. The connection member has preferably a pair of end plates disposed at opposite ends of the rotor and a plurality of connecting rods extending axially from one of the end plates to mechanically connect the magnet holders from opposite ends. Each of the end plates may have a plurality of fixing holes so that one end of each of the connection rods can be riveted thereto. Each of the pole core members may have a chamfered corner on the back thereof, and each of the end plates is disposed in the chamfered corner between opposite ends of the pole core members. The connection member may be a pair of cooling fans disposed on opposite ends of the rotor and a plurality of connecting rods extending axially from one of the cooling fans to mechanically connect the magnet holders.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS (First Embodiment)

A first embodiment is described with reference to FIGS. 1–4.

Figure 1:
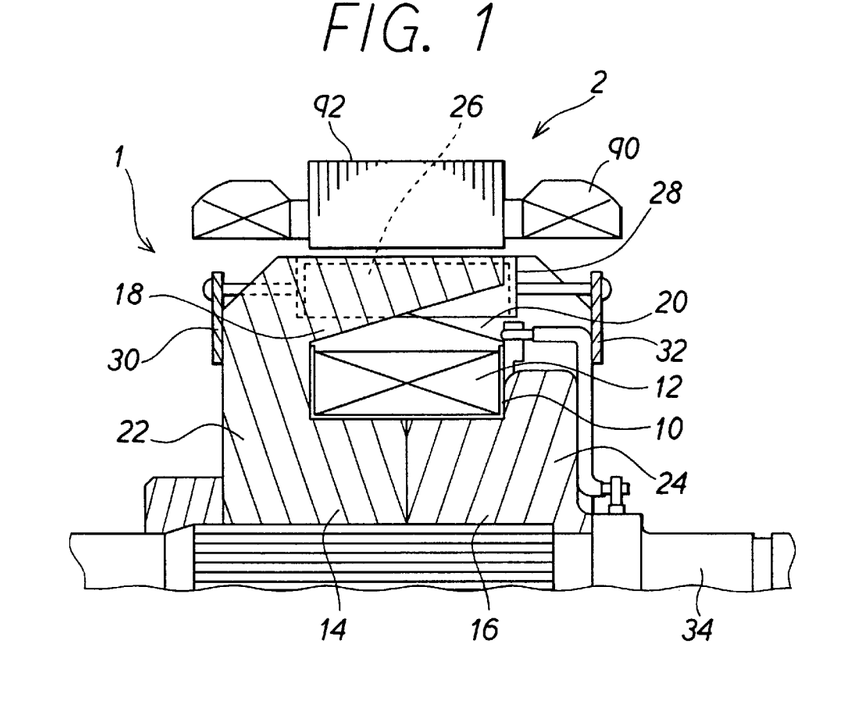
FIG. 1 is a fragmental cross-sectional view illustrating a main portion of an alternator according to a first embodiment of the present invention.
Figure 2:
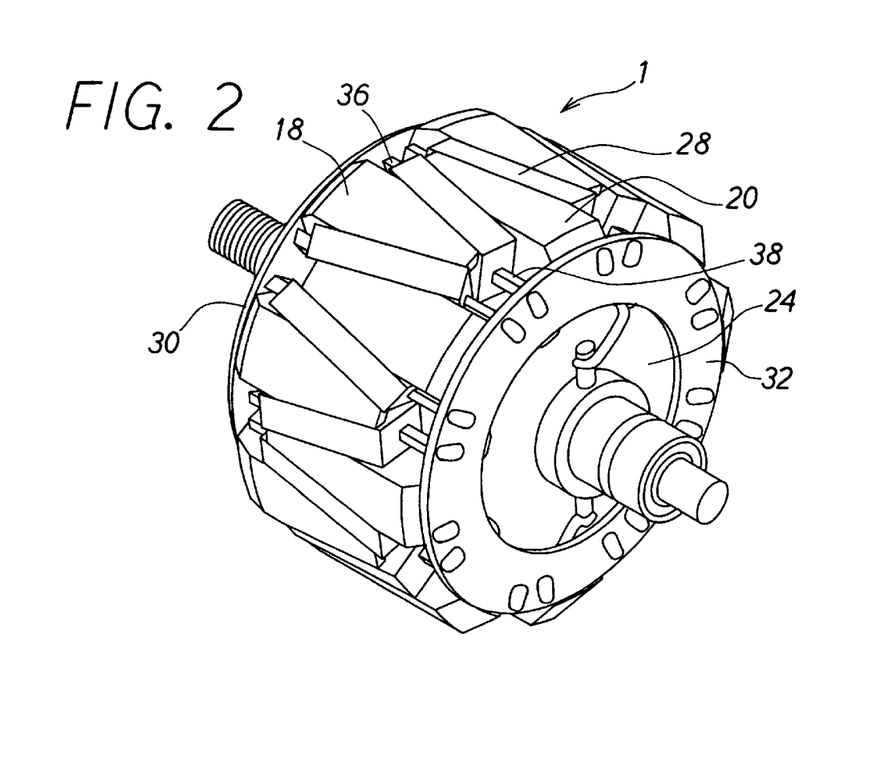
FIG. 2 is a perspective view illustrating a rotor of the alternator shown in FIG. 1.
Figure 3:
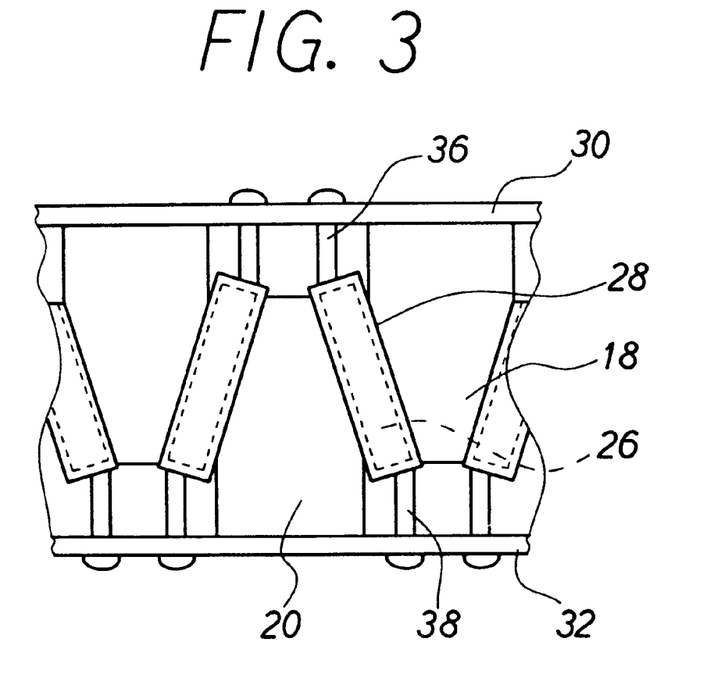
FIG. 3 is a fragmental view illustrating a main portion of the rotor shown in FIG. 2.
Figure 4:
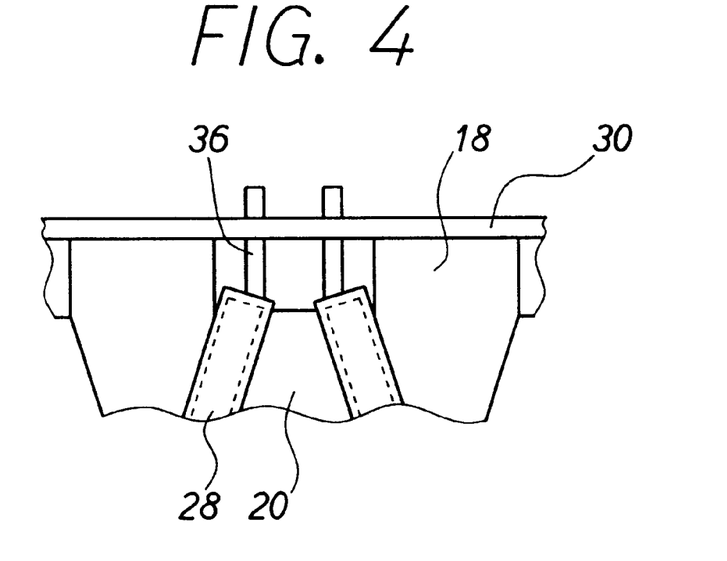
FIG. 4 is a fragmental view illustrating a step of manufacturing the rotor shown in FIG. 3.

A rotor 1 has a bobbin 10 which holds a cylindrical field coil 12, a Lundel-type pole core which is composed of a pair of pole core members 22 and 24 respectively having eight claw poles 18 and 20, sixteen permanent magnets 26 and magnet holders 28 each of which is disposed between adjacent two of the claw poles 18 and 20, a pair of annular end plates 30 and 32 fixed to opposite ends of the rotor 1 and a shaft 34. The permanent magnets 26 are made of ferrite magnet material, resin magnet material or rare metal. The annular plates 30 and 32 can be made of either nonmagnetic metal, resinous material or magnetic material. A stator 2 is disposed to surround the rotor 1 and has a stator core 92 and a three-phase stator coil 90. Each of the magnet holders 28 is made of nonmagnetic material such as stainless steel or aluminum and forms a rectangular parallelopiped shape to fit the space between adjacent two of the claw poles 18 and 20. Each of the magnet holders 28 has an insertion opening for the permanent magnet at radially inside surface thereof and a pair of connection rods 36 and 38 extending axially from the opposite end surfaces thereof. The connection rods 36 and 38 are anchored to the annular end plates 30 and 32 respectively as shown in FIG. 3. As shown in FIG. 4, for example, the head portion of each of the connection rods 36 is inserted to one of holes formed at radially outer portions of the end plate 30 and riveted. The connection rods 38 are also riveted to the end plate 32 in the same manner. The connection rods 36 and 38 can be fixed to the end plates 30 and 32 by welding or bolt-nut connection. If the connection rods 36 and 38 are made of resinous material, the head portions of the rods 36 and 38 are heated and deformed after inserting the same into the holes of the end plates 30 and 32. The end plates 30 and 32 are fixed to the pole core members 22 and 24 by screws or by welding.

Since the permanent magnets are held by the magnet holder 28 and the magnet holder 28 is fixed to the pole core members 22 and 24, the pole core members 22 and 24 and the claw poles 18 and 20 are not required to have precise sizes for holding the permanent magnets therebetween.

(Second Embodiment)

Figure 5:
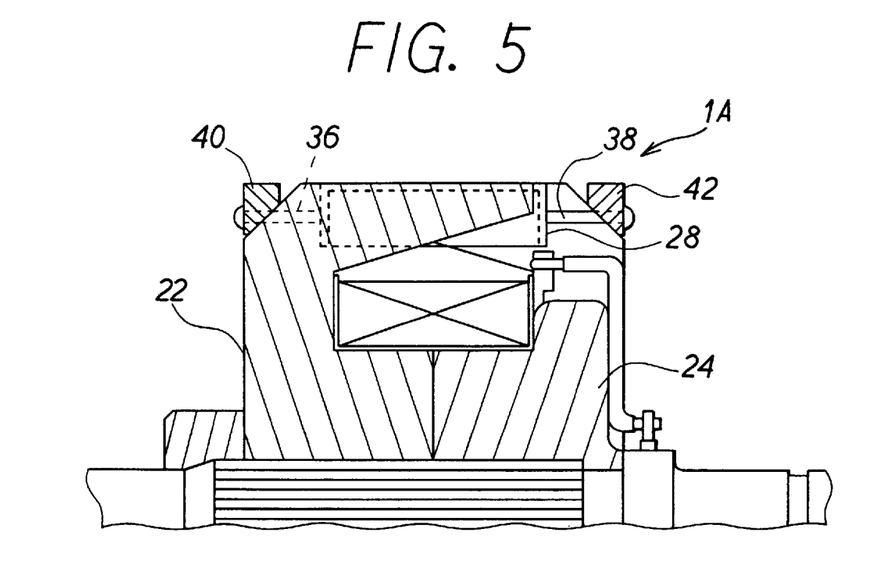
FIG. 5 is a cross-sectional view illustrating a main portion of a rotor according to a second embodiment of the present invention.
Figure 6:
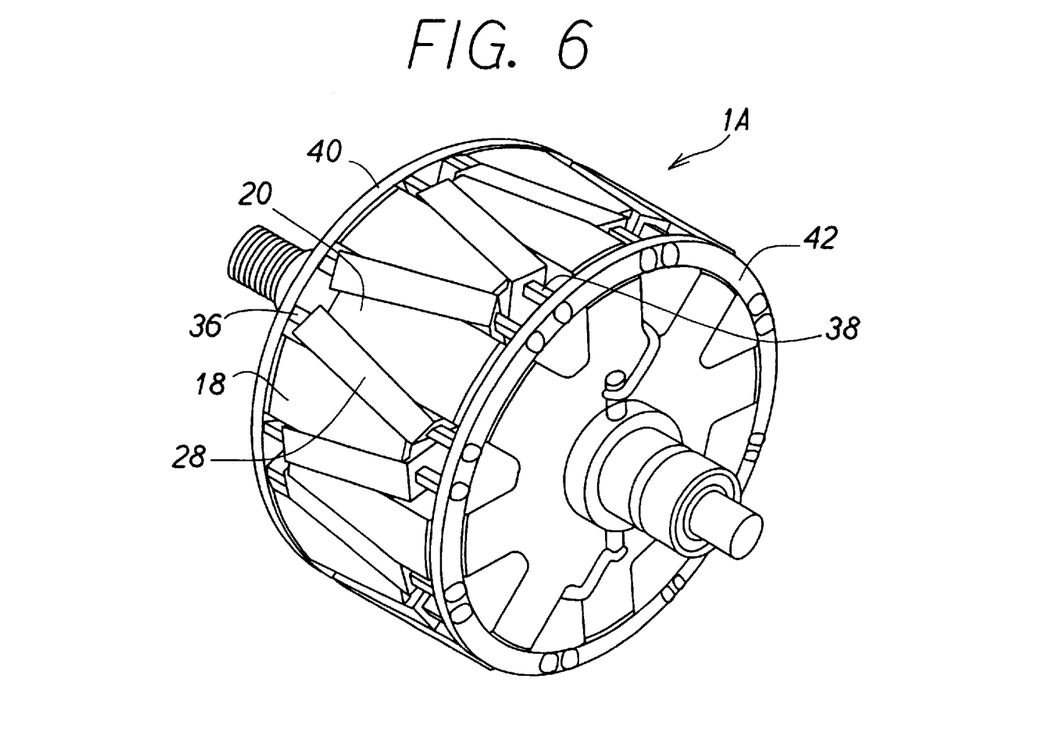
FIG. 6 is a perspective view illustrating the rotor shown in FIG. 5.

A rotor 1A according to a second embodiment of the present invention is described with reference to FIGS. 5 and 6.

Each of the pole core members 22 and 24 has a chamfered corner on the back thereof, and each of annular end plates 40 and 42 is disposed in the chamfered corner between opposite ends of the core members 22 and 24. The end plates 40 and 42 are fixed to the pole core members 22 and 24 respectively, and the connection rods 36 and 38 of the magnet holders are respectively riveted to the end plates 40 and 42 in the same manner as described with respect to the first embodiment. This structure provides a space for a cooling fan on each of the opposite ends of the rotor 1A.

Figure 7:
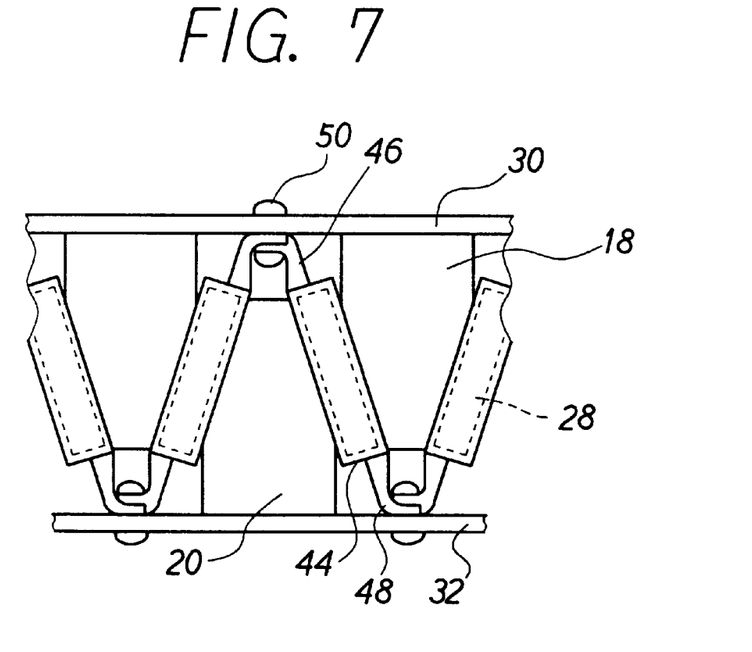
FIG. 7 is a fragmental view illustrating a variation of the rotor shown in FIG. 6.
Figure 8:
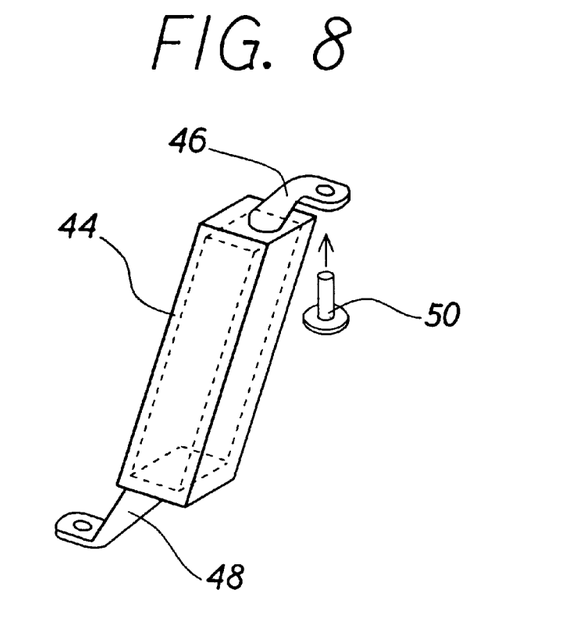
FIG. 8 is a perspective view illustrating a magnet holder of the rotor shown in FIG. 7.

A variation of the connection rods 36 and 38 is shown in FIGS. 7 and 8. Each of the connection rods 46 and 48 is shaped into an angle bracket having a rivet hole on the head thereof. Each pair of the connection rods 46 is riveted to the end plate 30 by one rivet, and each pair of the connection rods 48 is riveted to the end plate 32 by one rivet. Therefore, the magnet holders 28 form a rigid-diagonal-beam-structure, and the riveting step becomes simpler.

Figure 9:
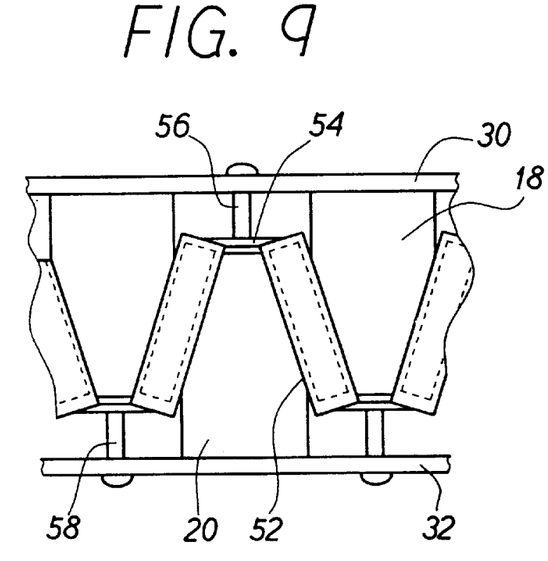
FIG. 9 is a fragmental view illustrating a variation of the rotor shown in FIG. 6.

FIG. 9 illustrates another connecting structure of magnet holders 52. One end of each of the magnet holders 52 is connected to one of adjacent magnet holders 52 by a connection rod 54 extending in the rotating direction, and the other end thereof is connected to the other of the adjacent holders 52 by another connection rod extending in the rotating direction. Each of the connection rods 54 is secured to corresponding one of the end plate 30 and 32 by corresponding one of rivets 56 and 58. The rivets 56 and 58 can be connected to the connection rods 54 integrally.

(Third Embodiment)

Figure 10:
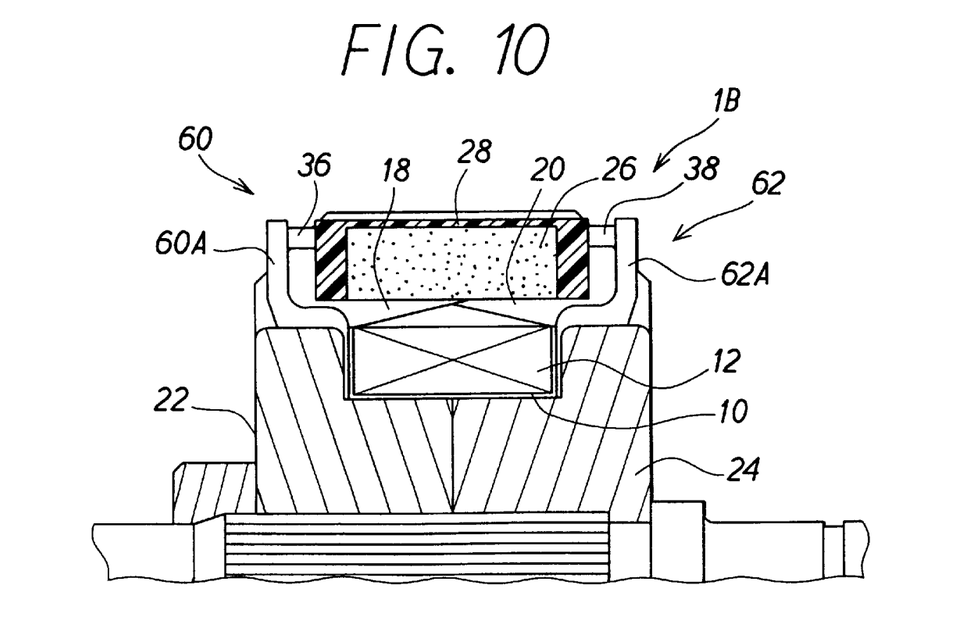
FIG. 10 is a fragmental cross-sectional view illustrating a main portion of a rotor according to a third embodiment of the present invention.

A rotor 1B according to a third embodiment of the present invention is described with reference to FIG. 10. A pair of annular end plates 60 and 62 are disposed respectively between the bobbin 10 and one of the pole core members 22 and 24. The end plate 60 has eight pieces of step portions 60A respectively disposed between the base portion of the claw poles 18, and the end plate 62 has also eight pieces of step potions 62A respectively disposed between the base portion of the claw poles 20. Each of the magnet holders 28 is connected to corresponding one pair of the step portions 60A and 62A by a pair of the connection rods 36 and 38. This structure makes the connection rods 36 and 38 shorter than the structure according to the first or second embodiment shown in FIG. 1 or FIG. 5. Accordingly, vibrations of the magnet holders 28 can be reduced more effectively.

Figure 11:
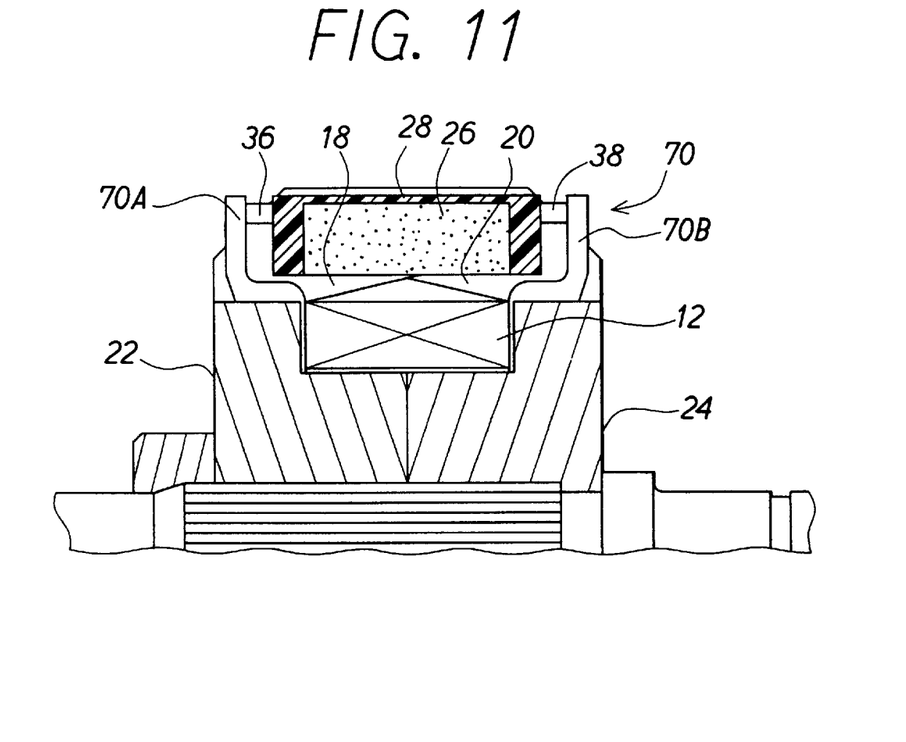
FIG. 11 is a fragmental cross-sectional view illustrating a main portion of a variation of a rotor according to the third embodiment.

As a variation of the above embodiment, FIG. 11 shows step portions 70A and 70B which are formed integrally with the flanges of the bobbin 10. The step portions correspond to the above step portions 60A and 62A shown in FIG. 10.

(Fourth Embodiment)

Figure 12:
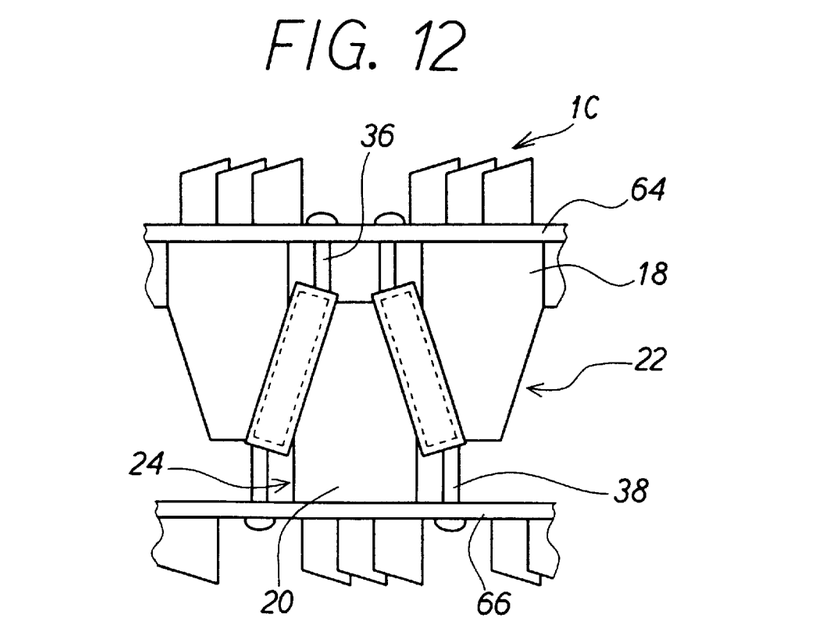
FIG. 12 is a fragmental view illustrating a rotor according to a fourth embodiment of the present invention.

A rotor 1C according to a fourth embodiment of the present invention is described with reference to FIG. 12. A pair of annular end plates 30 and 32 of the rotor according to the first embodiment are replaced with a pair of cooling fans 64 and 66. The cooling fans 64 and 66 can be formed of iron plates, aluminum die-casts or molds of resinous material.

(Fifth Embodiment)

Figure 13:
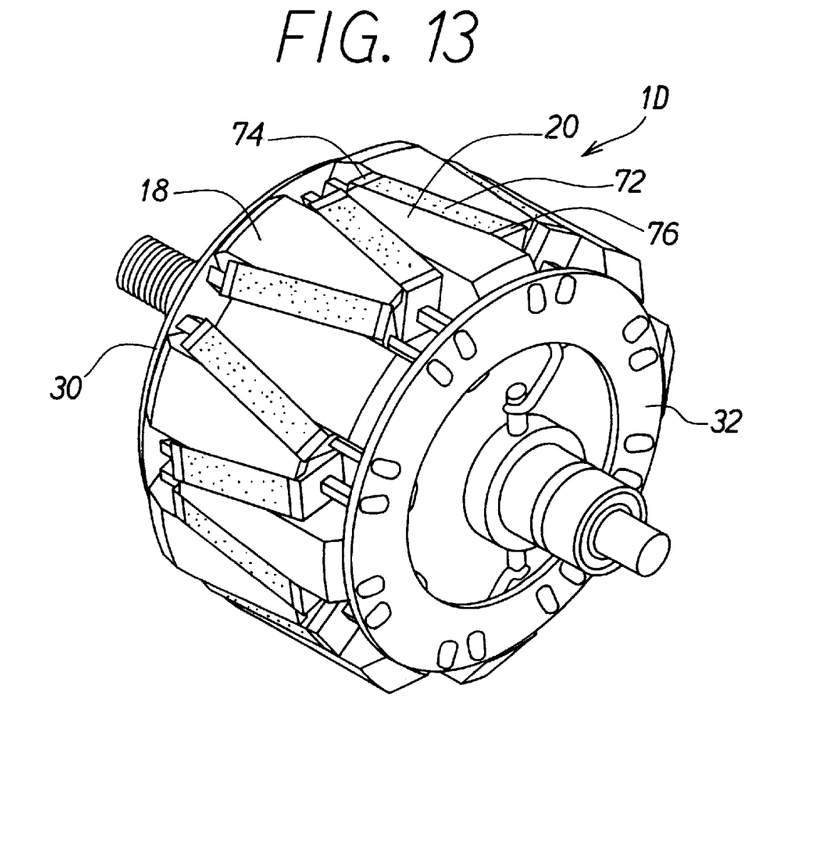
FIG. 13 is a perspective view illustrating a rotor according to a fifth embodiment of the present invention.
Figure 14:
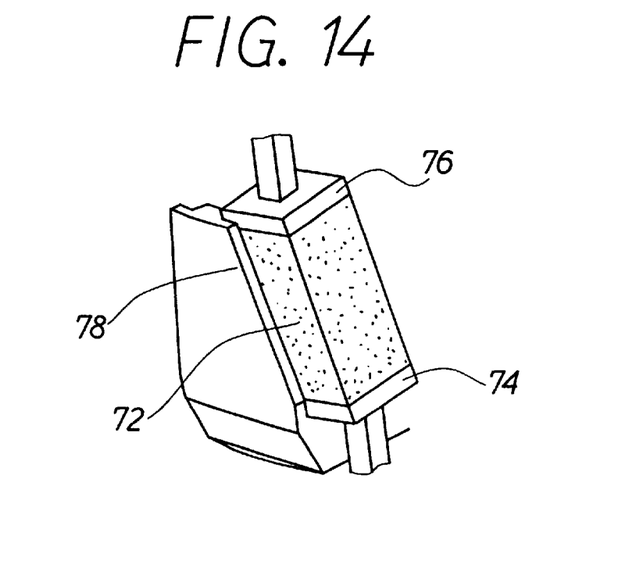
FIG. 14 is a fragmental view illustrating a portion including a permanent magnet of the rotor shown in FIG. 13.

A rotor 1D according to a fifth embodiment of the present invention is described with reference to FIGS. 13 and 14. The magnet hold 28 shown in FIG. 1 is replaced by a pair of holding plates 74 and 76. The holding plates 74 can be formed integrally with the end plate 30 and, also, the holding plates 76 can be formed integrally with the end plate 32. In order to hold the permanent magnets 72 in the radial direction, each of permanent magnets 72 is held under the claw poles 18 and 20. For this purpose, each of the claw poles has eaves formed along the both sides thereof in the rotating direction as shown in FIG. 14.

(Sixth Embodiment)

Figure 15:
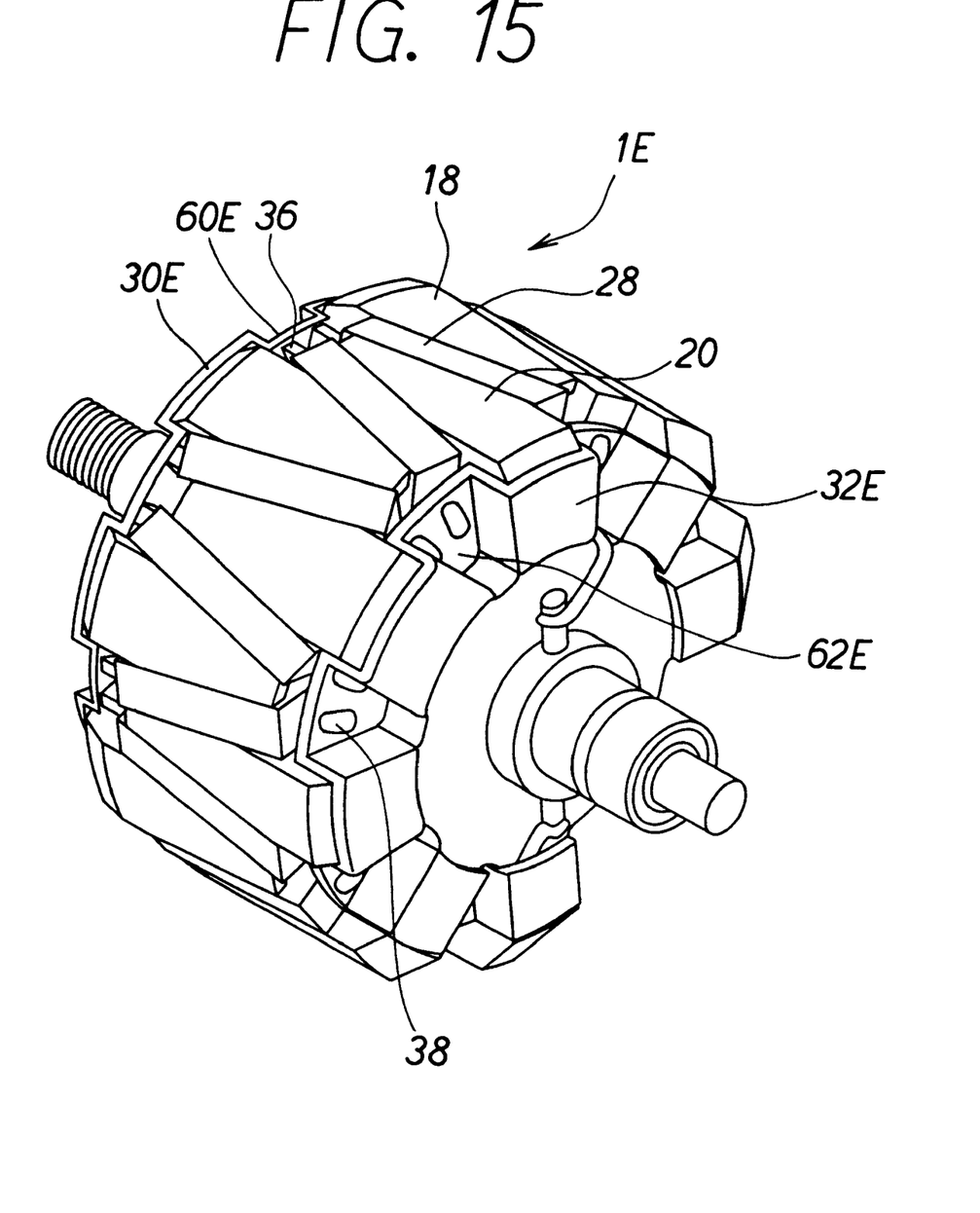
FIG. 15 is a perspective view illustrating a rotor according to a sixth embodiment of the present invention.

A rotor 1E according to a sixth embodiment of the present invention is described with reference to FIG. 15.

The end plate 30 and 32 shown in FIG. 1 are replaced with a pair of end plates 30E and 32E which have eight step portions 60E and 62E respectively. The step portions are similar to the step portions shown in FIGS. 10 and 11.

Each of the magnet holders 28 is connected to corresponding pair of the step portions 60E and 62E by a pair of the connection rods 36 and 38. The connection rods 36 and 38 are shorter than in the structure according to the first or second embodiment shown in FIG. 1 or FIG. 5. Accordingly, vibrations of the magnet holders 28 can be reduced more effectively.

In the foregoing description of the present invention, the invention has been disclosed with reference to specific embodiments thereof. It will, however, be evident that various modifications and changes may be made to the specific embodiments of the present invention without departing from the broader spirit and scope of the invention as set forth in the appended claims. Accordingly, the description of the present invention in this document is to be regarded in an illustrative, rather than restrictive, sense.

What is claimed is:

1. A rotary electric machine comprising:

a stator having an inner periphery; and a rotor disposed inside of said inner periphery of said stator, said rotor comprising:

a pair of pole core members each of which has a core portion and a plurality of claw poles extending axially from an outer periphery of said core portion, each of said claw poles of one of said core members extending between adjacent two of said claw poles of the other core portion;

a plurality of magnet holders and permanent magnets held in said magnet holders, each of said plurality of magnet holders being disposed in a space between two of said pole core members;

a connection member for axially fixing said magnet holders to said pole core members;

wherein said connection member comprises a pair of end plates disposed at opposite ends of said rotor and a plurality of connecting rods extending axially to mechanically connect to said magnet holders from opposite ends.

2. A rotary machine as claimed in claim 1, wherein each of said end plates has a plurality of fixing holes for receiving one end of each of said connection rods and enabling said one end of each of said connection rods to be riveted to said end plates.

3. A rotary electric machine as claimed in claim 1, wherein
each of said pole core members has a chamfered corner on the back thereof, and each of said end plates is disposed in said chamfered corner between opposite ends of said pole core members.

4. A rotary electric machine comprising:

a stator having an inner periphery; and a rotor disposed inside of said inner periphery of said stator, said rotor comprising:

a pair of pole core members each of which has a core portion and a plurality of claw poles extending axially from an outer periphery of said core portion, each of said claw poles of one of said core members extending between adjacent two of said claw poles of the other core portion;

a plurality of magnet holders and permanent magnets held in said magnet holders, each of said plurality of magnet holders being disposed in a space between two of said pole core members;

a connection member for axially fixing said magnet holders to said pole core members;

wherein said connection member comprises a pair of cooling fans disposed on opposite ends of said rotor and a plurality of connecting rods extending axially to mechanically connect to said magnet holders.

5. A rotary electric machine including:

a stator having an inner periphery; and a rotor disposed inside of said inner periphery of said stator, said rotor comprising:

a pair of pole core members each of which has a core portion and a plurality of claw poles extending axially from an outer periphery of said core portion, each of said claw poles of one of said core members extending between adjacent two of said claw poles of the other core portion;

a plurality of magnet holders and permanent magnets held in said magnet holders, each of said plurality of magnet holders being disposed in a space between two of said pole core members;

a connection member for axially fixing said magnet holders to said pole core members;

wherein said connection member comprises a pair of members disposed at opposite ends of said rotor and a plurality of connecting rods extending axially to connect to said magnet holders from opposite ends.

6. A rotary electric machine as claimed in claim 5, wherein
said pair of members comprises a pair of end plates disposed at opposite ends of said rotor.

7. A rotary electric machine as claimed in claim 6, wherein
each of said end plates has a plurality of fixing holes for receiving one end of each of said connection rods and enabling said one end of each of said connection rods to be riveted to said end plates.

8. A rotary electric machine as claimed in claim 6, wherein
each of said pole core members has a chamfered corner on the back thereof, and each of said end plates is disposed in said chamfered corner between opposite ends of said pole core members.

9. A rotary electric machine as claimed in claim 5, wherein
said connection member comprises a pair of cooling fans disposed on opposite ends of said rotor.

10. A rotary electric machine comprising:

a stator having a stator coil and a stator core; and a rotor including:

a field coil, a bobbin for holding said field coil;

a pair of pole core members each of which has a core portion and a plurality of claw poles extending axially from an outer periphery of said core portion, each of said claw poles of one of said core members extending between adjacent two of said claw poles of the other core portion to enclose said field coil;

a plurality of magnet holders and permanent magnets held in said magnet holders, each of said holders being disposed in a space between two of said claw poles;

a pair of end plate members extending from opposite ends of said bobbin to opposite ends of said magnet holders axially fixing said magnet holders to said pole core members;

wherein said bobbin has a pair of flanges, and said end plate members are integral with said flanges.

* * * * *